United States Patent Office 2,777,873
Patented Jan. 15, 1957

2,777,873

PREPARATION OF ESTERS OF ω-AMINO ACIDS

Robert H. Hasek, Kingsport, Tenn., assignor to Eastman Kodak Company, Rochester, N. Y., a corporation of New Jersey No Drawing. Application July 1, 1954,
Serial No. 440,843

6 Claims. (Cl. 260—482)

This invention relates to a new and improved method for preparing various ω-amino acid esters. More particularly, the invention is concerned with the preparation of such acid esters by reductive amination of aldehydic acids and esters thereof.

It is known that primary amines can be prepared by hydrogenating the reaction product of an aldehyde and ammonia in the presence of a hydrogenation catalyst. Variations in the reaction conditions and use of primary amines in place of ammonia permit the production of secondary amines by this procedure. This reaction is described in some detail by W. S. Emerson, "Organic Reactions," vol. IV, pages 175–255 (1948), John Wiley & Sons, Inc. It is also known that esters of organic carboxylic acids react with ammonia and alkylamines to give the corresponding amides. In view of this known reactivity of both aldehyde and ester groups with amines, it was surprising to find that certain compounds containing both of these groups in the same molecule, for example, aliphatic aldehydic acid esters, under reductive amination reaction conditions, gave substantial yields of ω-amino acid esters. Accordingly, in my new process the ammonolysis of the ester group is completely suppressed or greatly minimized. The amino acid esters prepared by my method are valuable intermediates for the preparation of other organic compounds, and are especially useful for preparing ω-amino acids and polyamides therefrom.

It is, accordingly, an object of my invention to provide a new and improved method for preparing esters of amino acids by reductive amination of esters of aldehydic acids. Another object is to provide a process wherein ammonolysis of the ester group is completely suppressed or greatly minimized. Another object is to provide a process for preparing unusually stable esters of amino acids. Other objects will become apparent from a consideration of the following description of my invention.

In accordance with the invention, I prepare the ω-amino acid esters of my invention by reacting certain saturated aliphatic aldehydic acids, preferably alkyl esters thereof (alkyl aldehydates) with ammonia or with a primary alkylamine and with hydrogen, in the presence of a suitable hydrogenation catalyst. The reaction may be represented by the following equation:

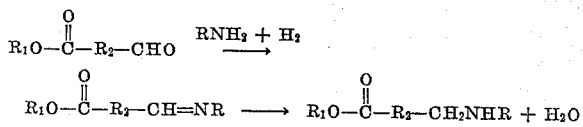

wherein R represents an atom of hydrogen or an alkyl group containing from 1 to 8 carbon atoms, e. g. methyl and ethyl, propyl, isopropyl, n-butyl, isobutyl, sec.-butyl, tert.-butyl, octyl, etc., groups, $R_1$ represents an alkyl group containing from 1 to 4 carbon atoms and $R_2$ represents a divalent straight chain or branched chain alkylene group containing from 2 to 10 carbon atoms. The reaction with ammonia or with amines is usually carried out in a single step, but where the intermediate aldimine is quite stable, the reaction can also be carried out in two steps, i. e. the aldimine is first formed and then hydrogenated. The proportion of ammonia or the alkylamine can be used in amounts equivalent to the aldehydic ester, but advantageously from 2 to 20 moles or even more of ammonia or amine per mole of the aldehydic ester is employed, the excess of ammonia or amine tending to suppress side reactions such as the formation of secondary amines, which presumably occurs by reductive amination of the aldehyde by the first formed primary amine. The best results are obtained under strictly anhydrous conditions. Advantageously, the reductive amination to ω-amino acid esters can be carried out in an inert solvent medium such as a saturated monohydric aliphatic alcohol, e. g. methyl alcohol, ethyl alcohol, propyl alcohol, butyl alcohol, etc., and aromatic liquids such as benzene, but preferably one consisting of the alcohol corresponding to that employed in the ester of the aldehydic acid. Thus, for the reductive amination of isopropyl adipaldehydate, the most suitable solvent is isopropyl alcohol. Presumably the use of the corresponding alcohol as solvent represses ammonolysis or hydrolysis of the ester. Ammonolysis of the ester group also appears to be repressed by reductive amination of the aldehydic ester with inactive amines containing 4 or more carbon atoms such as tert.-butylamine, tert.-octylamine, etc. Where ammonia or an unrestricted amine such as methylamine, ethylamine, butylamine, etc. as opposed to tert.-butylamine or tert.-octylamine is employed as the aminating agent, the aldehydic ester employed is preferably a secondary or tertiary ester, i. e. wherein $R_1$ is a branched chain alkyl group such as isopropyl, sec.-butyl or tert.-butyl groups. The presence of either factor—an aldehydic ester resistant to ammonolysis or an inactive amine—is sufficient for the conduct of the reductive amination; both factors may be used, but only one is necessary. In addition, it is possible to accomplish the reductive amination of an aldehydic ester when neither factor is present, but the yields of amino esters are lower. Benzene and other hydrocarbon solvents can also be employed.

In general, the temperature of the reductive amination process of my invention must be adjusted for each individual case, to provide for a rapid reaction at the lowest practical temperature. Since it is desirable to avoid prolonged exposure of either the reactants or the product to the increased reaction temperature, a continuous process is advantageous, or at least a gradual addition of the aldehydic ester to the reaction vessel charged with ammonia or amine, catalyst and solvent, and brought to reaction conditions. Reductive amination may be conducted in some cases at temperatures as low as 100° C. and in some cases as high as 160° C., although this latter temperature is within the range where ammonolysis of esters is said to take place readily. Lower temperatures, provided a rapid reaction is still obtained, are distinctly more advantageous; higher temperatures tend to produce excessive ammonolysis. The preferred temperature range of my process is from 115° to 160° C.

The pressure of hydrogen required in the reductive amination according to my process is less critical than the temperature. Reductive amination may be accomplished at pressures of only one or two atmospheres, but it is preferred to use pressures from about 20 atmospheres to about 1000 atmospheres (from about 300 to 15,000 p. s. i.). This range of pressures has the distinct advantage of lowering the reaction temperature required for effective reductive amination. The use of extreme pressures, i. e. pressures above about 1000 atmospheres, can also be used but these conditions give rise to difficulties in design and operation of suitable pressure vessels. Such extreme pressures and requirement of apparatus for their application are by no means necessary in the practice of my invention.

Suitable hydrogenation catalysts for use in my process are finely divided metallic nickel, cobalt, iron, platinum or palladium in such forms as Raney nickel or cobalt, reduced sintered cobalt oxides, nickel supported on kieselguhr, colloidal platinum, amorphous platinum from reduction of platinum oxide, palladium supported on charcoal, etc. Particularly active forms of Raney nickel and cobalt catalysts can be prepared by either washing the active catalyst (following its preparation by action of alkali on nickel-aluminum or cobalt-aluminum alloy) under an atmosphere of hydrogen or by addition of a trace of chloroplatinic acid to an ammoniacal suspension of the catalyst. For further details of these latter, very active catalysts, reference can be had to H. Adkins and H. R. Billica, "Organic Syntheses," vol. 29, page 24 (1949), John Wiley and Sons, Inc., New York; and to D. R. Levering et al., J. Amer. Chem. Soc., 72, page 1190 (1950). Generally, the lower reaction temperatures are required when relatively high concentrations of these catalysts are used. Supported catalysts such as nickel on kieselguhr and massive catalysts such as foraminate nickel-aluminum are entirely suitable catalysts and are particularly useful in continuous reaction systems.

Suitable aldehydic esters for use in my process are those represented by the general formula:

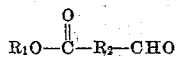

wherein $R_1$ and $R_2$ have the previously defined meanings. Typical aldehydic esters include propyl succinaldehydate, isopropyl succinaldehydate, sec.-butyl succinaldehydate, tert.-butyl succinaldehydate, the corresponding propyl-, isopropyl-, sec.-butyl-, and tert.-butyl glutaraldehydates, the corresponding propyl-, isopropyl-, sec.-butyl-, and tert.-butyl adipaldehydates, the corresponding propyl-, isopropyl-, sec.-butyl-, and tert.-butyl pimelaldehydates, the corresponding propyl-, isopropyl-, sec.-butyl-, and tert.-butyl sebacaldehydates, the corresponding esters of β-methylglutaraldehydic acid, γ,γ-dimethylglutaraldehydic acid, and the like. Suitable primary alkylamines containing from 1 to 8 carbon atoms for reacting with the above defined esters according to my invention include methylamine, ethylamine, propylamine, isopropylamine, n-butylamine, sec.-butylamine, tert.-butylamine, corresponding amylamines, hexylamines, heptylamines, octylamines, etc.

The invention is illustrated further by the following examples.

*Example 1*

A 1-liter rocking-type autoclave was charged with 200 cc. of isopropyl alcohol, 50 g. of ammonia and 5 g. of Raney nickel. Hydrogen was added to a pressure of 1,000 p. s. i. and the autoclave was heated to 140° C. 75 g. of isopropyl adipaldehydate was pumped into the autoclave, followed by 30 cc. of isopropyl alcohol to rinse the pump lines. After one hour at 140° C. and 1,800 p. s. i. pressure (more hydrogen was added to maintain this pressure during the reaction), the autoclave was cooled and discharged. The reaction mixture was filtered, distilled at atmospheric pressure to remove ammonia and the bulk of the isopropyl alcohol. The distillation pressure was then reduced to 5 mm., and isopropyl ε-aminocaproate was received at 96°–104° C./5 mm. pressure. It had a refractive index of $n_D^{20}$ 1.4370 at 20° C. The yield of product was 53 g. equivalent to about 70%, based on the weight of isopropyl adipaldehydate.

A solution of 15 g. of isopropyl ε-aminocaproate (prepared as in above example) in 25 cc. of water was refluxed under a fractionating column, the isopropyl alcohol-water azeotrope being removed as it formed during the hydrolysis. The hydrolysis was essentially complete in 12 hours; refluxing was continued for an additional 5 hours. Residual water was removed by heating the still residue in a steam bath overnight. 5 g. of the residue, which apparently was a polyamide of low molecular weight, was heated at 240° C. under an atmosphere of hydrogen for one hour and finally under vacuum for an hour. The sticking point of fibers drawn from the molten product was 195°–200° C.

*Example 2*

50 g. of liquid ammonia, 200 cc. of isopropyl alcohol and 5 g. of Raney nickel catalyst were charged to a 1-liter stainless steel autoclave, hydrogen was added to 1,500 p. s. i. pressure, and the autoclave was heated to 140° C. A solution of 93 g. of isopropyl pimelaldehydate in 100 cc. of isopropyl alcohol was pumped into the autoclave over a period of 21 minutes, and the autoclave was cooled immediately afterwards. The reaction mixture was filtered and distilled to give 42.6 g. of crude amino ester, which was redistilled to give isopropyl-ζ-aminoenanthate, B. P. 104° C./5 mm. pressure, specific gravity at 20° C. of approximately 0.921 and a refractive index $n_D^{20}$ of approximately 1.439.

10 g. of isopropyl-ζ-aminoenanthate prepared as above described and 15 cc. of water were refluxed for 16 hours and the isopropyl alcohol was removed as it formed by azeotropic distillation of isopropyl alcohol-water mixture. 7 g. of the crude product obtained by evaporation of the still residue was heated in a sealed glass tube at 240° C. for 2 hours, then under hydrogen for 0.5 hour and in vacuum for 0.5 hour. The polymer which had formed had good color and fibers drawn from the melt exhibited the typical property of cold drawing.

Isopropyl-ζ-aminoenanthate as above described was hydrolyzed by being refluxed overnight in an equal volume of dilute (1:1) hydrochloric acid, and the solution was evaporated to dryness. The crude hydrochloride salt (22 g.) was dissolved in 200 cc. of water and passed through a column of ion-exchange resin. 8 g. of ζ-aminoenanthic acid was recovered. Recrystallization from aqueous alcohol gave colorless crystals, M. P. 195°–196° C. This material was polymerized by being heated in a sealed tube at 240° C. for 2 hours, then under a hydrogen atmosphere for 1.5 hours and finally in vacuum for 0.7 hour. The polymer was drawn into fibers with a sticking point of 216°–220° C., and a microcrystalline melting point of 227°–229° C.

*Example 3*

5 g. of Raney cobalt catalyst and 100 cc. of isopropyl alcohol were placed in a 1-liter stirred autoclave, 155 g. (9.1 mol.) of ammonia was added, and hydrogen was pressed in to 500 p. s. i. total pressure. The autoclave was heated at 157° C. and a solution of 86 g. (0.5 mol.) of isopropyl adipaldehydate in 100 cc. of isopropyl alcohol was injected over a period of 45 minutes. Hydrogen was added periodically to maintain the reaction pressure. After the addition of the ester, the pressure was raised to 2500 p. s. i. by addition of hydrogen, and heating was continued for 30 minutes. The autoclave was cooled, vented and discharged. The reaction product, worked up in the manner of Example 1, yielded 47 g. of isopropyl ε-aminocaproate, boiling at 92°–102° C./5 mm. pressure, equivalent to a yield of approximately 55%, based on the weight of isopropyl adipaldehydate.

*Example 4*

A mixture of 100 g. of ethyl adipaldehydate, 150 cc. of ethanol and 20 g. of Raney nickel was placed in a 1-liter rocking-type autoclave, 100 g. of anhydrous ammonia was added, and hydrogen was pressed in to a total pressure of 1500 p. s. i. The autoclave was heated to 125° C. for 25 minutes, and then cooled, vented and discharged. The reaction product was filtered, the excess of ammonia and solvent were removed by heating the filtrate on a steam bath, and the residue was distilled under reduced pressure. A yield of 37 g. of crude ethyl ε-aminocaproate, boiling at 80°–85° C./2 mm. pressure, was obtained which was equivalent to about 37%, based on the weight of ethyl adipaldehydate.

*Example 5*

A 1-liter stirred autoclave was charged with 200 cc. of isopropyl alcohol, 5 g. of Raney cobalt catalyst, 47 g. of anhydrous ammonia and hydrogen to 1500 p. s. i. pressure. The autoclave was heated to 140° C. and a solution of 100 g. of sec.-butyl pimelaldehydate in 100 cc. of isopropyl alcohol was pumped in over a period of 35 minutes. The autoclave was cooled immediately, vented and discharged. The reaction mixture was filtered to remove the catalyst and distilled at atmospheric pressure to a liquid temperature of 100° C. The residue was distilled under reduced pressure to give 53.5 g. of sec.-butyl ζ-aminoenanthate, boiling at 96°–106° C./5 mm. pressure, equivalent to a yield of approximately 53.5% based on the weight of sec.-butyl pimelaldehydate.

*Example 6*

A 1-liter stirred autoclave was charged with 200 cc. of isopropyl alcohol, 5 g. of Raney cobalt catalyst, 53 g. of anhydrous ammonia and hydrogen to 1500 p. s. i. pressure. The autoclave was heated to 150° C. and a solution of 44 g. of tert.-butyl pimelaldehydate in 50 cc. of isopropyl alcohol was pumped in over a period of 7 minutes. The autoclave was cooled immediately, vented and discharged. The reaction mixture was worked up as in Example 4 to give 16 g. of tert.-butyl ζ-aminoenanthate, boiling point 97°–104° C./2.5–3.0 mm. pressure, which was equivalent to about 37%, based on the weight of tert.-butyl pimelaldehydate.

*Example 7*

158 g. of ethyl adipaldehydate was added gradually to a solution of 129 g. of tert.-octylamine in 200 cc. of thiophene-free benzene. The milky solution was refluxed under a Dean-Starke trap until no more water was evolved. The benzene solution of the aldimine which formed was then placed in an autoclave with 5 g. of Raney nickel and treated with hydrogen at 1500 p. s. i. pressure and 118°–125° C. for 1.5 hours. The catalyst was removed by filtration and the residual liquid was distilled through a 40 cm. Vigreux column under reduced pressure. A yield of 155 g. of ethyl ε-tert.-octylaminocaproate, boiling at 139°–146° C./5 mm. pressure $n_D^{20}$ 1.4509 at 20° C., was obtained, which was equivalent to approximately 57%, based on the weight of ethyl adipaldehydate.

By proceeding in similar manner as set forth in the preceding examples, other ω-amino acid esters and N-alkyl substituted ω-amino acid esters can be prepared from the various mentioned reactants. It has been indicated that addition of the aldehydic ester to the ammonia or amine solution in the reaction vessel is a desirable technique. In cases where the intermediate aldimine is relatively unstable, this technique is preferred; the formation and hydrogenation of the aldimine taking place in rapid succession in the reaction vessel. However, in certain cases, as in Example 7, a stable aldimine may be preformed and even isolated, the hydrogenation then being done as a distinctly separate step.

What I claim is:

1. A method for the preparation of ω-amino acid esters which comprises heating an anhydrous aldehydic ester having the general formula:

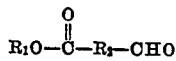

with an anhydrous nitrogen compound having the general formula:

wherein R represents a member selected from the group consisting of an atom of hydrogen and an alkyl group containing from 1 to 8 carbon atoms, $R_1$ represents an alkyl group containing from 1 to 4 carbon atoms and $R_2$ represents a divalent alkylene group containing from 2 to 10 carbon atoms in an anhydrous solvent medium selected from the group consisting of a saturated monohydric aliphatic alcohol containing from 1 to 4 carbon atoms and benzene, at from 115° to 160° C. and a pressure of from 1 to 1000 atmospheres, in the presence of hydrogen and a hydrogenation catalyst, in the proportions of from 1 to 20 moles of the said nitrogen compound to each mole of the said aldehydic ester, and recovering the formed ω-amino acid ester from the reaction mixture.

2. A method for the preparation of isopropyl ε-aminocaproate which comprises heating anhydrous isopropyl adipaldehydate with anhydrous ammonia, in anhydrous isopropylalcohol, at from 115° to 160° C., and at a pressure of from 20 to 1000 atmospheres, in the presence of hydrogen and a hydrogenation catalyst, in the proportions of from 1 to 20 moles of ammonia to each mole of the isopropyl aldehydate, and recovering the formed isopropyl ε-aminocaproate from the reaction mixture.

3. A method for the preparation of ethyl ε-aminocaproate which comprises heating anhydrous ethyl adipaldehydate with anhydrous ammonia in anhydrous ethyl alcohol, at from 115° to 160° C. and at a pressure of from 20 to 1000 atmospheres, in the presence of hydrogen and a hydrogenation catalyst, in the proportions of from 1 to 20 moles of ammonia to each mole of the ethyl adipaldehydate, and recovering the formed ethyl ε-amino-caproate from the reaction mixture.

4. A method for the preparation of sec.-butyl ζ-aminoenanthate which comprises heating anhydrous sec.-butyl pimelaldehydate with anhydrous ammonia, in anhydrous isopropyl alcohol, at from 115° to 160° C. and at a pressure of from 20 to 1000 atmospheres, in the presence of hydrogen and a hydrogenation catalyst, in the proportions of from 1 to 20 moles of ammonia to each mole of the sec.-butyl pimelaldehydate, and separating the formed sec.-butyl ζ-aminoenanthate from the reaction mixture.

5. A method for the preparation of tert.-butyl ζ-aminoenanthate which comprises heating anhydrous tert.-butyl pimelaldehydate with anhydrous ammonia, in anhydrous isopropyl alcohol, at from 115° to 160° C. and at a pressure of from 20 to 1000 atmospheres, in the presence of hydrogen and a hydrogenation catalyst, in the proportions of from 1 to 20 moles of ammonia to each mole of the tert.-butyl pimelaldehydate, and separating the formed tert.-butyl ζ-aminoenanthate from the reaction mixture.

6. A method for the preparation of ethyl ε-tert.-octylaminocaproate which comprises heating anhydrous ethyl adipaldehydate with anhydrous tert.-octylamine, in anhydrous benzene, at from 115° to 160° C. and at a pressure of from 20 to 1000 atmospheres, in the presence of hydrogen and a hydrogenation catalyst, in the proportions of from 1 to 20 moles of the tert.-octylamine to each mole of the ethyl adipaldehydate, and separating the formed ethyl ε-tert.-octylaminocaproate from the reaction mixture.

References Cited in the file of this patent

UNITED STATES PATENTS 2,546,960    Moe et al. _____ Apr. 3, 1951
2,636,051    Whetstone et al. _____ Apr. 21, 1953

OTHER REFERENCES

Piepenbrink: Chem. Abstracts 45 (1951), 9465a.